United States Patent [19]

Reen et al.

[11] 4,255,494

[45] Mar. 10, 1981

[54] SINTERED FERROMAGNETIC POWDER METAL PARTS FOR ALTERNATING CURRENT APPLICATIONS

[75] Inventors: Orville W. Reen, New Kensington; Merlin L. Osborn, Saxonburg, both of Pa.

[73] Assignee: Allegheny Ludlum Steel Corporation, Pittsburgh, Pa.

[21] Appl. No.: 33,288

[22] Filed: Apr. 25, 1979

[51] Int. Cl.[3] .................... H01H 85/16; H02K 15/12

[52] U.S. Cl. .................................. 428/551; 428/552; 428/928; 75/208 R; 310/44; 336/233; 336/234

[58] Field of Search ................ 336/233, 234; 310/216, 310/217, 44; 428/928, 551, 552; 75/208 R

[56] References Cited

U.S. PATENT DOCUMENTS

| | | | |
|---|---|---|---|
| 1,669,644 | 5/1928 | Andrews | 310/44 |
| 2,221,983 | 11/1940 | Mayer et al. | 310/44 UX |
| 2,283,925 | 5/1942 | Harvey | 336/233 |
| 2,803,570 | 8/1957 | Hespenheide | 336/234 |
| 3,535,200 | 10/1970 | Bergstom | 336/233 |
| 3,948,690 | 4/1976 | Pavlik | 336/233 |

*Primary Examiner*—Brooks H. Hunt
*Attorney, Agent, or Firm*—Vincent G. Gioia; William J. O'Rourke, Jr.

[57] ABSTRACT

A method of making a metal core for alternating current applications by powder metallurgy is disclosed. Ferro-magnetic powder is pressed into a cross section of the core, with the thickness of the cross section approaching that below which the green density is no longer uniform throughout the volume of the part. Additional cross sections are pressed to meet the overall core thickness requirement when the sections are subsequently stacked. The sections are stacked in non contacting relationship and sintered. The sections are separated by an air gap or magnetic insulating medium.

10 Claims, No Drawings

SINTERED FERROMAGNETIC POWDER METAL PARTS FOR ALTERNATING CURRENT APPLICATIONS

BRIEF SUMMARY OF THE INVENTION

The present invention relates to magnetic cores, and more particularly to ferromagnetic powder metal cores made from laminations of pressed and sintered metal powder which exhibit low core losses and require low magnetizing forces when subjected to an alternating current magnetizing force.

Cores such as those used in transformers, are typically constructed of a plurality of parallel laminations of strip material, such as 0.014 inch gage silicon steel. The individual laminations are usually cut, or blanked, from the strip in rectangular, L, EE or EI types. After shearing, the individual sheets are annealed to remove mechanical stresses in the laminations. Except for certain uses, such as small transformers, the individual sheets are typically varnished or otherwise coated to provide insulation between adjacent sheets of an assembled core and thus prevent the current from circulating between the sheets and result in excessive core loss. A core of strip material is considered particularly advantageous because it permits all of the magnetic flux to flow parallel to the direction in which the strip was rolled. Steel has its lowest loss and maximum permeability in the roll direction.

Although powder metallurgical parts have been used for some time for direct current applications, the use of powder metallurgical parts as laminations for magnetic cores as described herein is considered unique. There appear to be only a few references in the prior art that relate to magnetic properties of a powder metallurgical part subjected to an alternating current field. One article entitled "Magnetic Properties of Sintered Iron-Silicon Alloys" was translated from Poroshkovaya Metallurgiya, No. 2 (122), pp. 93–96, February, 1973. In discussing the use of powder metallurgical parts for alternating current applications the authors of this article stress the importance of protecting the material against oxidation, increasing the sintering temperature, and attaining the highest possible density in order to maximize the magnetic qualities of a powder metal part. Another article entitled "Effect of Phosphorus Additions Upon the Magnetic Properties of Parts from Iron Powder," translated from Poroshkovaya Metallurgiya, No. 4 (124), pp. 29–32, April, 1973, pertains to the use of iron powder to make one-piece sintered magnetic cores in alternating field devices. This article concludes, as does German Pat. No. 112,026 that phosphorus additions to the powder increase the electrical resistivity of the iron thereby enabling magnetic losses to be lowered.

In October, 1978, Mr. K. H. Moyer presented an article entitled "P/M Parts for Magnetic Applications" at the Powder Metallurgical Technical Conference in Philadelphia, Pa. The second part of this article is directed to a glimpse at AC properties of P/M materials. The author of this article concludes that if porous materials can be made thin enough, such as less than 0.030 inch (0.76 mm.) there can be distinct advantages to using powder metal parts instead of conventional materials.

The use of sintered powder metal parts has generally been restricted to those involving direct current, such as relays. The reason for the restriction to direct current applications is due primarily to the high core losses incurred by a magnetic field generated by alternating current. To minimize core losses, conventional strip materials with thicknesses on the order of 0.009 to 0.020 inches (0.023 to 0.051 cm.) are generally assembled in a laminated condition. Generally, powder metal parts within this thickness range are not easily produced by present manufacturing capabilities.

Accordingly, a method of making metal core for alternating current applications from ferromagnetic powder laminations is desired which would exhibit low core losses and require low magnetizing forces when subjected to an alternating current magnetizing force.

The present invention may be summarized as providing a method of making a metal core for alternating current applications from ferromagnetic powder. For test purposes the core may be constructed with substantially uniform cross sectional dimensions in relation to an overall core thickness requirement. It will be understood that a core component designed for actual use may not have uniform dimensions. The method comprises the steps of pressing a ferromagnetic powder into a cross section of the core, with the thickness of the cross section approaching that below which the green density is no longer uniform throughout the volume of the part. Additional ferromagnetic powder metal cross sections are pressed to meet the overall core thickness requirement when the individual cross sections are subsequently stacked in the desired alignment, with all of the individual cross sections of substantially equal thickness. The individual cross sections are stacked with the cross sectional faces of overlapping areas of adjacent parts in noncontacting relationship. The method also includes the step of sintering the individual cross sections either prior to or after stacking.

Among the advantages of the present invention is the provision of a new and improved method of making a metal core for alternating current applications which would experience low core loss as compared to one-piece powder metal materials.

Another advantage of the present invention is to provide a method of making a metal core which requires low alternating current magnetizing forces.

An objective of the present invention is to provide a method of making a metal core from powder metallurgical materials which may compete with conventional strip materials.

Another advantage of the present invention is that a core consisting of individual laminations of powder metal materials may be produced which are more uniform from lamination to lamination in terms of physical and chemical properties resulting in more uniform operation of such metal core when subjected to alternating current fields.

The above and other objectives and advantages of this invention will be more fully understood and appreciated with reference to the following detailed description.

DETAILED DESCRIPTION

In the production of a ferromagnetic powder metal core in accordance with the present invention, individual laminates are constructed from ferromagnetic powder by conventional powder metallurgical processes. For example, a mold cavity in a conventional press is constructed to specific desired dimensions. The cavity is filled with the ferromagnetic powder of a specified weight which depends upon the dimensions and density requirements for the individual laminate to be pressed. The press is activated and the upper and lower punches exert pressure on the powder in the mold cavity therebetween, to produce a part to the specific dimensions and density requirements.

The lateral dimensions, either length and width or inside and outside diameter, of the individual lamination, or cross section, produced by the process described above may be varied according to the desired dimension of the metal core. The thickness dimension of the individual laminates is limited. It has been found that the minimum depth for each laminate is that thickness below which the green density is no longer uniform throughout the volume of the part. Due primarily to certain mechanical limitations inherent in present pressing equipment it appears that parts thinner than 0.100 inch (0.254 cm.) cannot be consistently produced with a uniform green density throughout the volume of the part. Such deviations in green density appear to be created as a result of nonuniform filling of the powder into the die cavity of the press. Additionally, in the production of such thin powder metal parts, the shoe which not only holds the powder to be poured into the mold cavity with each press cycle, but also pushes the pressed part off the lower punch, requires a certain clearance above the platen of the press. It seems that thin parts may rest within the clearance dimension under the shoe after they are pressed, and would not be pushed off the lower punch by the shoe as is required. This condition could result in filling the die cavity with powder directly onto a previously pressed part rather than into an empty die cavity. Since many presses are mechanical and the strokes are controlled by cams, and the like, a double-filled die may result in breakage of some member of the die set.

Theoretically, the minimum thickness at which a part could be pressed with a green density that is uniform throughout the volume of the part is on the order of 0.2 mm. (0.008 inch). The minimum thickness which is apparently available with conventional equipment is on the order of from about 0.1 inch (0.254 cm.) to about 0.15 inch (0.381 cm.). In the process of the present invention, sufficient ferromagnetic powder metal laminates, or individual cross sections, are pressed to meet the required overall core thickness. The individual laminates may be stacked in substantial vertical alignment. It will be understood by those skilled in the art that horizontal stacks, stepped stacks and the like are also comprehended by the present invention.

In a preferred embodiment of the present invention all of the individual cross sections are of substantially equal thickness. When pressing individual laminates from powder metal the overall core thickness requirement is known, and the individual section thickness can be calculated therefrom. With powder metal laminates the thickness, as well as other dimensions, may be uniformly controlled from laminate to laminate.

The individual laminates may be stacked in substantial vertical alignment, horizontal alignment, or in angular alignment, as desired, with the cross sectional faces of the overlapping areas of adjacent laminations in noncontacting relationship. The pack of sintered powder metal laminations, must have each laminate separated from adjacent laminations. Such separation may be accomplished by spacing the laminates with air therebetween or by providing a magnetic insulating medium therebetween. A ceramic magnetic insulating powder, such as aluminum oxide or zirconium oxide may be used between the individual laminations as an insulator. Alternatively, a magnetic insulator such as insulating paper or the like may be placed between the individual laminations.

In the construction of a magnetic core from a number of laminations, the shape of the stacked assembly must be maintained. This can be accomplished with the use of adhesives. Alternatively, the parts may be stacked and the shape maintained by wire, or the like, such as that wire used to create a magnetic field in the core.

The powder metal laminations which are press-formed in the present invention must be sintered, such as in conventional sintering furnaces. Sintering may be accomplished by placing the individual pressed laminations onto a nonreactive surface in a sintering furnace, or by stacking as many pressed parts as needed to fulfill the thickness requirement of the core, and sintering all of the pressed laminations together. In a preferred embodiment, the individual laminations may be insulated from each other and stacked into an assembled core and the assembled core could be sintered after such stacking.

By the process of the present invention, ferromagnetic cores made from sintered powder metal laminations may be assembled to achieve the same physical dimensions of a one-piece, or single, powder metal core. The assembled cores with laminations separated by an air gap or a magnetic insulating medium, exhibit lower core losses and require lower magnetizing forces than the one-piece core of the same overall thickness when subjected to an alternating current magnetizing force.

Cores of conventional strip material have an air gap or insulation between individual laminations which is always parallel to the plane of the laminations. In the powder metal laminated core of the present invention there are air gaps, or pores, in an infinite number of directions in addition to the parallel direction between laminations. Such additional air gaps, or pores, appear to be beneficial to the same degree as the parallel air gap, even though the parallel air gap is required between the powder metal laminations to reduce the alternating current magnetizing force and core losses. As shall be noted in detail below, the magnetizing force and core loss of a one-piece powder metal core is considerably greater than that of a core assembly of powder metal laminations. Although such relationship may also apply to conventional strip constructions as well as powder metal constructions, it appears that the percentage of difference may be more beneficial for the powder metal construction than for the solid strip construction. This additional benefit may be due to the presence of additional pores in the powder metal materials as discussed above.

In practicing the method of the present invention, a blend of ferromagnetic powder consisting of ferro-silicon, electrolytic iron, and zinc stearate powders was prepared to an analysis of 2.30% silicon, 0.75% zinc stearate, with the balance essentially iron. It will be understood to those skilled in the art that the zinc stearate is added to serve as a lubricant in the preparation of pressed parts. Lubricants are typically removed during the sintering process and have no residual effect on the chemical or physical properties of the ferrous material in the sintered condition. The ferro-silicon used in the powder blend discussed hereinbelow contained 16.87% silicon.

The blended powders were compacted into toroids by double-action pressing at 45 tons per square inch (620 MPa). The toroids had nominal diameters after pressing of 3.750 cm. outside diameter by 2.500 cm. inside diameter. The thickness of the toroids was dependent upon the weight of the powder pressed. After pressing the toroids were placed on aluminum oxide powder which served to keep them from contact with a low carbon steel sheet on which they were placed. The sheet of toroids was placed in a conventional sintering furnace for 60 minutes at 2,300° F. in a vacuum. A pressure of 0.1 Torr (13.3. Pa) was maintained with hydrogen during sintering. After sintering, the toroids were cooled to ambient temperature in the furnace. The physical properties of four exemplary toroids after sintering are set forth in Table I below.

TABLE I

| Example | Weight Grams | Outside Diameter Centimeters | Inside Diameter Centimeters | Thickness Centimeters | Density Grams per CM Cubed |
|---|---|---|---|---|---|
| I | 23.8328 | 3.700 | 2.531 | 0.590 | 7.06 |
| II | 8.0061 | 3.685 | 2.520 | 0.199 | 7.09 |
| III | 8.0040 | 3.689 | 2.521 | 0.199 | 7.06 |
| IV | 7.9706 | 3.687 | 2.521 | 0.199 | 7.08 |

The one-piece core, Example I, with a thickness of 0.590 cm. was prepared and tested. Also, a thinner one-piece core, Example II, with a thickness of 0.199 was prepared and tested. Then a three-piece core was made by stacking toroid Examples II, III and IV without a magnetic insulating medium therebetween and was tested as an assembly. This test was done to determine if the core loss of the single ring, Example I, was similar to that of the uninsulated assembly, Examples II–IV, which would indicate that there was no difference in ferromagnetic powder material between the parts.

In conducting such test, the cores were placed in fiber cases and uniformly wound with 100 turns primary and 100 turns secondary windings. The density of each core was calculated from its weight and physical dimensions. The cross sectional area for the voltage and induction level was determined from the core weight, mean magnetic path length, and density according to conventional practices. The peak magnetizing force was determined by calculations from a peak-peak voltage reading across a small series resistance. The cores were demagnetized by using 60 Hertz voltages slowly decreased from a value well over the knee of the induction-peak magnetizing force curve to zero voltage. The core loss values were determined by testing the samples from the lowest to the highest induction levels by conventional procedures.

Table II below shows the 60 Hertz peak magnetizing force at induction levels of from 1 to 10 kilogauss in 1 kilogauss increments.

TABLE II

| Example | 60 Hertz Peak Magnetizing Force in Oersteds at Various Induction Levels | | | | | | | | | |
|---|---|---|---|---|---|---|---|---|---|---|
| | 1KG | 2KG | 3KG | 4KG | 5KG | 6KG | 7KG | 8KG | 9KG | 10KG |
| I | 1.22 | 1.86 | 2.65 | 3.72 | 5.13 | 7.06 | 9.41 | 12.5 | 16.3 | 21.2 |
| II | 0.86 | 1.19 | 1.50 | — | 2.28 | 2.80 | 3.42 | 4.16 | 5.06 | 6.19 |
| II, III IV Assembly | 1.01 | 1.26 | 1.53 | 1.84 | 2.26 | 2.76 | 3.39 | 4.14 | 5.04 | 6.19 |

Table III below shows the 60 Hertz core losses in watts per pound at induction levels of from 1 to 10 kilogauss in 1 kilogauss increment.

TABLE III

| Example | 60 Hertz Core Loss in Watts Per Pound at Various Induction Levels | | | | | | | | | |
|---|---|---|---|---|---|---|---|---|---|---|
| | 1KG | 2KG | 3KG | 4KG | 5KG | 6KG | 7KG | 8KG | 9KG | 10KG |
| I | 0.084 | 0.283 | 0.616 | 1.15 | 1.97 | 3.16 | 4.89 | 7.23 | — | — |
| II | 0.046 | 0.161 | 0.332 | 0.567 | 0.886 | 1.31 | 1.85 | 2.54 | 3.43 | 4.56 |
| II, III IV Assembly | 0.0495 | 0.166 | 0.334 | 0.565 | 0.863 | 1.26 | 1.79 | 2.46 | 3.36 | 4.46 |

It should be noted that in Table II above the values for Example II and for the assembly, Examples II, III and IV, are essentially the same, indicating that there is essentially no difference in the material. It is also noted that the magnetizing force at all induction levels is greater for the one-piece core, Example I, than for the assembled core assembly of three laminations, Examples II, III and IV assembly. Similarly, as noted from Table III the core loss at all induction levels is greater for the one-piece core, Example I, than for the laminated core, Example II, III and IV assembly.

In general, a core constructed of ferromagnetic powder laminations in accordance with the present invention exhibits a 60 Hertz core loss of less than 2.0 watts per pound when subjected to an alternating current magnetizing force at an induction level of about 7 kilogauss.

Whereas, the particular embodiments of this invention have been described above for purposes of illustration, it will be apparent to those skilled in the art that numerous variations of the details may be made without departing from the invention.

What is claimed is:

1. A method of making a metal core for alternating current applications from ferromagnetic powder, comprising pressing a ferromagnetic powder into a cross section of the core, with the thickness of the cross section approaching that below which the green density is no longer uniform throughout the volume of the part, pressing sufficient additional ferromagnetic powder metal cross sections to meet an overall core thickness requirement when the individual cross sections are subsequently stacked, stacking the individual cross sections with the cross sectional faces of adjacent parts in noncontacting relationship, and sintering the cross sections.

2. The method as set forth in claim 1 wherein the individual cross sections are separated by an air gap.

3. The method as set forth in claim 1 wherein the individual cross sections are separated by a magnetic insulating medium.

4. The method as set forth in claim 3 wherein the magnetic insulating medium is selected from the group consisting of aluminum oxide, zirconium oxide and insulating paper.

5. The method as set forth in claim 1 wherein the core exhibits a 60 Hertz core loss of less than 2.0 watts per pound when subjected to an alternating current magnetizing force at an induction level of 7 kilogauss.

6. The method as set forth in claim 1 wherein the individual cross sections are sintered prior to stacking.

7. The method as set forth in claim wherein the individual cross sections are sintered after stacking.

8. The method as set forth in claim 1 wherein the thickness of the individual cross sections is at least 0.008 inch.

9. The method as set forth in claim 8 wherein the thickness of the individual cross sections is less than 0.150 inch.

10. A ferromagnetic powder metal core for alternating current applications said core consisting of a plurality of core cross sections, each cross section having a fixed cross sectional dimension, with the sections arranged such that the faces of adjacent parts are stacked in vertical alignment in noncontacting relationship, said core produced by pressing a ferromagnetic powder into a cross section of the core, with the thickness of the cross section approaching that below which the green density is no longer uniform throughout the volume of the part, pressing sufficient magnetic powder metal cross sections to meet the overall core thickness requirement when the cross sections are subsequently stacked in vertical alignment with all individual cross sections of substantially equal thickness of at least 0.008 inch, assembling the individual cross sections in vertical alignment with the cross sectional faces of adjacent parts in noncontacting relationship, and sintering the cross sections.

* * * * *